(12) United States Patent
Benisty et al.

(10) Patent No.: US 11,188,251 B2
(45) Date of Patent: Nov. 30, 2021

(54) PARTITIONED NON-VOLATILE MEMORY EXPRESS PROTOCOL FOR CONTROLLER MEMORY BUFFER

(71) Applicant: Western Digital Technologies, Inc., San Jose, CA (US)

(72) Inventors: Shay Benisty, Beer Sheva (IL); Leonid Minz, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 111 days.

(21) Appl. No.: 16/662,340

(22) Filed: Oct. 24, 2019

(65) Prior Publication Data

US 2020/0057578 A1   Feb. 20, 2020

Related U.S. Application Data

(63) Continuation of application No. 15/846,787, filed on Dec. 19, 2017, now Pat. No. 10,466,906.

(51) Int. Cl.
*G06F 3/06* (2006.01)
*G06F 9/46* (2006.01)
*G06F 11/10* (2006.01)
*G06F 9/50* (2006.01)

(52) U.S. Cl.
CPC ............ *G06F 3/0658* (2013.01); *G06F 3/064* (2013.01); *G06F 3/0619* (2013.01); *G06F 3/0679* (2013.01); *G06F 9/466* (2013.01); *G06F 9/5061* (2013.01); *G06F 11/10* (2013.01)

(58) Field of Classification Search
CPC ........ G06F 3/061; G06F 3/0619; G06F 3/064; G06F 3/0658; G06F 3/0659; G06F 3/0679; G06F 9/466; G06F 9/5061; G06F 11/10; G06F 11/1068; G06F 12/0246; G06F 2212/7202
See application file for complete search history.

(56) References Cited

U.S. PATENT DOCUMENTS

2011/0016261 A1 * 1/2011 Lin ................... G06F 12/0246
                                                        711/103
2016/0172034 A1 * 6/2016 Oh ..................... G06F 12/0238
                                                        365/148
2016/0342545 A1 * 11/2016 Arai ................... G06F 12/0868

* cited by examiner

*Primary Examiner* — Aracelis Ruiz
(74) *Attorney, Agent, or Firm* — Dickinson Wright PLLC; Steven Hurles

(57) ABSTRACT

A method of accessing a storage device, including receiving, by a controller of the storage device, a host-write transaction directed to a memory space defined within the controller. The controller then classifies the host-write transaction based on a type of the host-write transaction to generate a classified transaction, and generates parity data based on the classified transaction. The controller stores data associated with the host-write transaction and the parity data in a memory of the controller. The method includes determining a destination address of the classified transaction and classifying, based on the destination address. Generating the parity data includes determining an allocated block size associated with the destination address and generating the parity data based on the allocated block size. The allocated block size varies based on the destination address. The method additionally includes translating the host-write transaction from a first protocol to a Non-Volatile Memory Express (NVMe) protocol.

13 Claims, 6 Drawing Sheets

PARTITIONED NON-VOLATILE MEMORY EXPRESS PROTOCOL FOR CONTROLLER MEMORY BUFFER

CROSS-REFERENCE TO RELATED APPLICATIONS

This patent application is a continuation-in-part of U.S. application Ser. No. 15/846,787 entitled "NVME Controller Memory Manager," filed Dec. 19, 2017. The application (Ser. No. 15/846,787) is incorporated herein by reference in its entirety.

BACKGROUND

The present technology relates to the operation of memory devices. Semiconductor memory devices are widely used in various electronic devices such as laptops, digital audio players, digital cameras, cellular phones, video game consoles, scientific instruments, industrial robots, medical electronics, solid state drives, automotive electronics, Internet of Things (IOT) devices and universal serial bus (USB) devices.

A memory device can be coupled to one or more hosts, where an interface between the host and the memory device includes a peripheral component interconnect express (PCIe) interface. The memory device is often managed by a controller, where among several roles, the controller is configured to interface between the host and the memory device. A controller can be implemented as part of the memory device or part of the host. As memory devices continue to grow in use, efforts continue to be directed at increasing performance and efficiency, and reducing power consumption during memory device operation.

SUMMARY

Various embodiments include a storage device including: a non-volatile memory; a volatile memory; and a controller including a memory, where the controller is configured to: receive a host-write transaction directed to a memory space defined within the controller, where the host-write transaction includes a destination address; classify the host-write transaction based on a type of the host-write transaction to generate a classified transaction; generate parity data based on the classified transaction; and store data associated with the host-write transaction and the parity data in a portion of the memory space in the controller.

Other embodiments include a method of accessing a storage device, including: receiving, by a controller of the storage device, a host-write transaction directed to a memory space defined within the controller; classifying the host-write transaction based on a type of the host-write transaction to generate a classified transaction; generate a parity data based on the classified transaction; and store data associated with the host-write transaction and the parity data in a memory of the controller.

Additional embodiments include a memory controller, including: a first terminal coupled to a memory array; a memory space including a portion that further includes a partition associated with a type of data structure and an error correction code block size; the memory controller configured to: receive a host-write transaction directed to the memory space, where the host-write transaction includes a destination address; classify the host-write transaction based on a type of the host-write transaction generate a classified transaction; store data associated with the host-write transaction and the parity data in the portion of the memory space.

BRIEF DESCRIPTION OF THE DRAWINGS

For a detailed description of example embodiments, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In various embodiments, a controller includes individual circuit components, an application-specific integrated circuit (ASIC), a microcontroller with controlling software or firmware, a digital signal processor (DSP), a processor with controlling software, a field programmable gate array (FPGA), or combinations thereof.

As described herein, methods of accessing a storage device are described. Upon receiving a host-write transaction, a controller analyzes the host-write transaction and stores the host-write transaction in a portion of memory based on a type of the host-write transaction. The portion of the memory within which the host-write transaction is stored, is a portion of memory of the controller. That is, the memory is located within the controller, in contrast to memory that is located within a host.

The portion of the controller's memory may be further partitioned, where each of the partitions stores a respective block of data, and the different partitions can store different block sizes of data. Each of the partitions is also associated with a respective ECC scheme. The manner in which the data is stored in the portion of memory enables a controller to operate the memory device in a manner that increases efficiency and performance, and reduces power consumption.

The description describes an example memory system and then turns to various aspects associated with accessing a storage device of the memory system. In particular, FIGS. 1 and 2 describe aspects of an example memory system, while FIGS. 3-6 describe aspects of storing a host transaction within a memory space of a controller.

Figure 1:
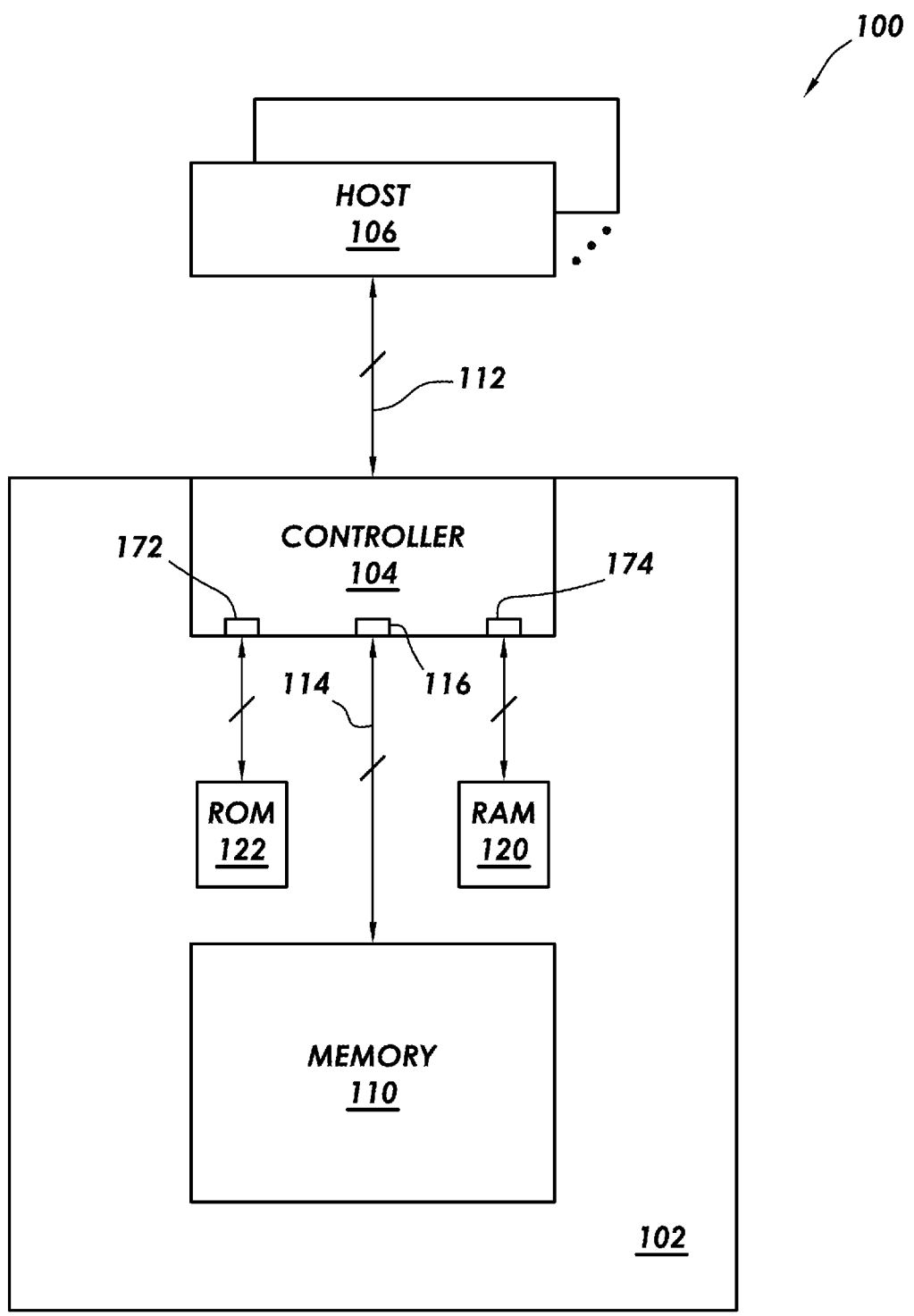
FIG. 1 is a block diagram of an example non-volatile memory system, in accordance with some embodiments.

FIG. 1 illustrates a block diagram of an example system architecture 100 including non-volatile memory "NVM" array 110 (hereinafter "memory 110"). In particular, the example system architecture 100 includes storage device 102 where a host 106 is communicatively coupled to the memory 110 by way of a controller 104. Although a single host 106 is used for illustrative purposes, the controller 104 may be coupled to several hosts, where some or all of the hosts access the memory 110.

Example embodiments of the storage device 102 include an internal storage drive (e.g., a notebook hard drive, a desktop hard drive), a removable mass storage device (e.g., a secure digital (SD) card, a micro secure digital (micro-SD) card, or a multimedia card (MMC), or a universal serial bus (USB) device). Additional examples of the storage device 102 include mass storage devices (e.g., an eSD/eMMC embedded flash drive), or any type of internal storage device, removable storage device, embedded storage device, external storage device, or network storage device.

The controller 104 is communicatively coupled to the host 106 by bus 112, additionally the controller 104 is communicatively coupled to the memory 110 by bus 114 (by way of port 116). The port 116 of the controller can include one or several channels coupling the memory 110, respectively. Furthermore, the buses 112 and 114 are implemented by several channels (e.g., physical connections). The depiction of a single bus is not meant to be limiting as one or more connections and interfaces can be used to communicatively couple the same components. In one example, the storage device 102 is coupled to the host 250 through a switch or a bride.

In some examples, the bus 112 implements any known or after developed communication protocol that enables the storage device 102 and the host 106 to communicate. Some non-limiting examples of a communication protocol include Secure Digital (SD) protocol, Memory Stick (MS) protocol, Universal Serial Bus (USB) protocol, Peripheral Component Interface Express (PCIe), protocols related to remote direct memory access (RDMA), or Advanced Microcontroller Bus Architecture (AMBA). In some examples, the interface 114 implements any known or after developed communication protocol. In embodiments where the storage device 102 is flash memory, the interface 114 is a flash interface, such as Toggle Mode 200, 400, or 800, or Common Flash Memory Interface (CFI).

In FIG. 1, the controller 104 is coupled to a random access memory (RAM) 120 (by RAM port 174) and a read only memory (ROM) 122 (by ROM port 172). Although in FIG. 1 the RAM 120 and the ROM 122 are shown as separate modules within the storage device 102, in some embodiments, the RAM 120 and the ROM 122 are located within the controller 104. In other cases, portions of the RAM 120 or ROM 122, can be located outside the controller 104. In other embodiments, the controller 104, the RAM 120, and the ROM 122 are located on separate semiconductor die.

The memory 110 of the storage device 102 includes several memory die, where a memory die can be defined in various ways. In one example, the memory 110 defines a physical set of memory die. In other embodiments, the memory 110 defines a logical set of memory die, where the memory 110 includes memory die from several physically different sets of memory die.

The memory 110 includes memory cells defined within the memory die that can be solid-state memory cells (e.g., flash), one-time programmable, few-time programmable, or many time programmable. Additionally, the memory cells in the memory die 110 can include single-level cells (SLC), multi-level cells (MLC), or triple-level cells (TLC). In some embodiments, the memory cells are fabricated in a planar manner (e.g., 2D NAND (NOT-AND) flash) or in a stacked or layered manner (e.g., 3D NAND flash). Furthermore, the memory cells can use charge-storing material such as floating gate or a charge-trapping material, where stored charge represents a data state.

In various embodiments, the host 106 includes any device or system that utilizes the storage device 102—e.g., a computing device, a memory card, a flash drive. In some example embodiments, the storage device 102 is embedded within the host 106—e.g., a solid state disk (SSD) drive installed in a laptop computer. In additional embodiments, the system architecture 100 is embedded within the host 106 such that the host 106 and the storage device 102 including the controller 104 are formed on a single integrated circuit chip. In embodiments where the system architecture 100 is implemented within a memory card, the host 106 can include a built-in receptacle or adapters for one or more types of memory cards or flash drives (e.g., a universal serial bus (USB) port, or a memory card slot).

Figure 2:
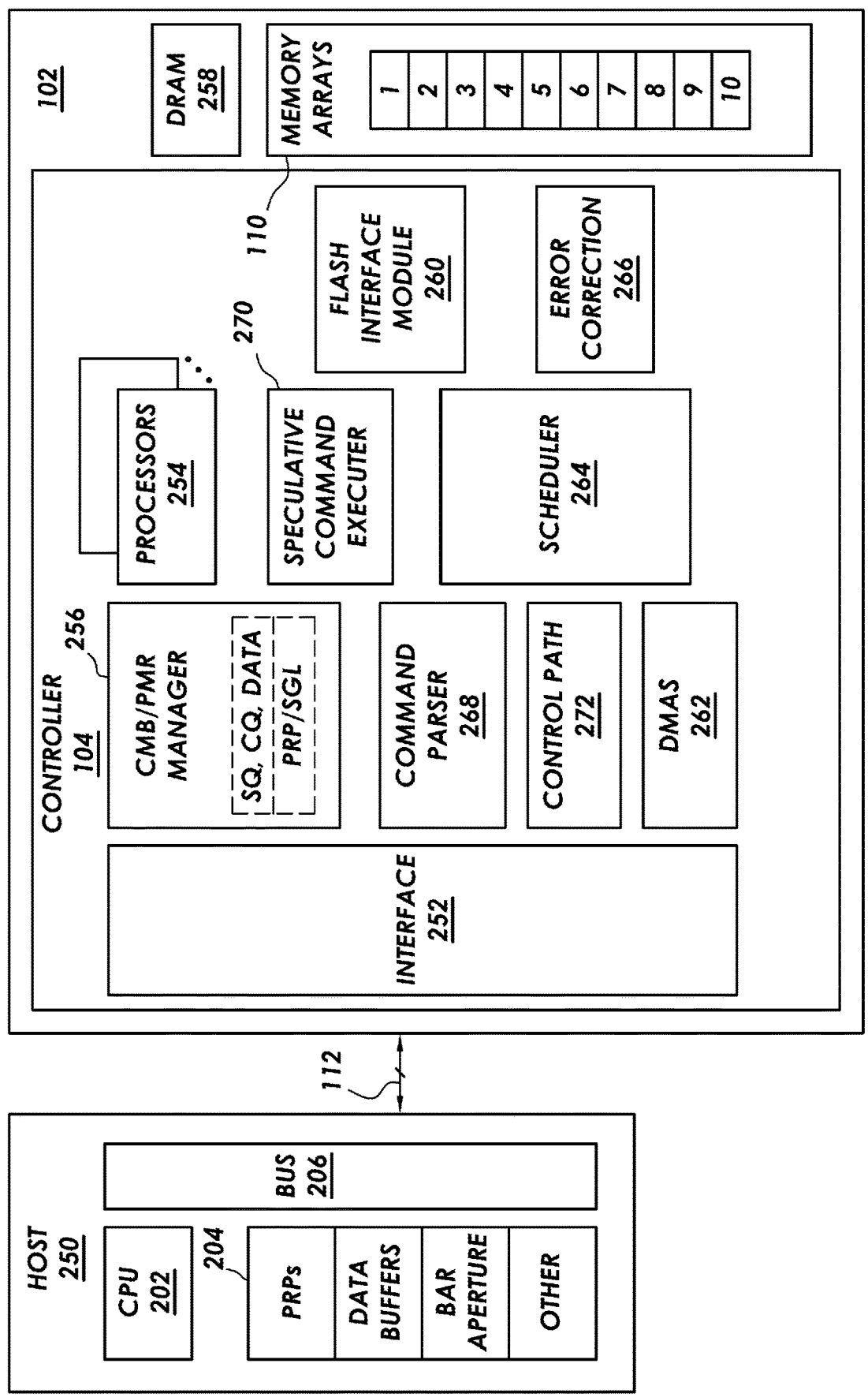
FIG. 2 is a block diagram of an example memory system, in accordance with some embodiments.

Although, the storage device 102 includes its own memory controller and drivers (e.g., controller 104)—described further in FIG. 2—the example described in FIG. 1 is not meant to be limiting. Other embodiments of the storage device 102 include memory-only units that are instead controlled by software executed by a controller on the host 106 (e.g., a processor of a computing device controls—including error handling of—the storage device 102). Additionally, any method described herein as being performed by the controller 104 can also be performed by the controller of the host 106.

Still referring to FIG. 1, the host 106 includes its own controller (e.g., a processor) configured to execute instructions stored in the storage device 102 and further the host 106 accesses data stored in the storage device 102, referred to herein as "host data". The host data includes data originating from and pertaining to applications executing on the host 106. In one example, the host 106 accesses host data stored in the storage device 102 by providing a logical address to the controller 104 which the controller 104 converts to a physical address. The controller 104 accesses the data or particular storage location associated with the physical address and facilitates transferring data between the storage device 102 and the host 106.

In embodiments where the storage device 102 includes flash memory, the controller 104 interfaces between a host and the memory 110 and accesses the memory 110 as described herein. Furthermore, the controller 104 formats the flash memory to ensure the memory is operating properly, maps out bad flash memory cells, and allocates spare cells to be substituted for future failed cells or used to hold firmware to operate the flash memory controller (e.g., the controller 104). Thus, the controller 104 accesses the memory and also performs various memory management functions such as, wear leveling (e.g., distributing writes to extend the lifetime of the memory blocks), garbage collection (e.g., moving valid pages of data to a new block and erasing the previously used block), and error detection and correction (e.g., read error handling).

The technology described herein can also be utilized with technologies in addition to the charge trapping and floating gate flash memory described herein. For example, in addition to flash memory (e.g., 2D and 3D NAND-type and NOR-type flash memory), examples of non-volatile memory include ReRAM memories, magnetoresistive memory (e.g., MRAM), and phase change memory (e.g., PCRAM). A person of ordinary skill in the art will recognize that this technology is not limited to a single specific memory structure, but covers many relevant memory structures within the spirit and scope of the technology as described herein and as understood by one of ordinary skill in the art.

FIG. 2 is a block diagram of one embodiment of the system 100, including a host 250 and the storage device 102 which includes the memory 110. The host 250 utilizes the memory 110 to write and read data, where the memory 110 is used for long-term data storage.

In one example, the host 250 includes a central processing unit (CPU) 202 connected to a host memory space 204, such as DRAM or other main memories. In various embodiments, application programs are stored within the host memory space 204, where components of the host 250 execute the application programs. The host 250 includes a bus 206 configured to interface with the transaction/data link/physical layers specific to an interface 252 of the controller 104, by way of the bus 112.

In FIG. 2, the controller 104 may include one or more processors 254, including multi-core processors. The processor 254 is configured to handle the components of the memory 110 through firmware code.

In one example, the controller 104 operates using an NVM Express (NVMe) protocol. The NVMe protocol is a communications interface/protocol developed for solid state drives (SSDs) where in some examples, the storage device 102 is coupled to the host 250 by way of a PCIe interface. The NVMe protocol provides to the host 250, a command queue and completion path to access data stored in the storage device 102.

The controller 104 includes a controller buffer manager (CMB) manager 256. The CMB manager 256 may alternatively, or additionally, be referred to as a persistent memory region (PMR) manager 256. The type of manager 256 depends on the manner in which data is stored in a memory of the controller. For example, contents of a CMB do not persist across power cycles and resets while contents of a PMR persist across power cycles and resets. For purposes of this description, the functionality of the CMB and PMR are similar and accordingly, the functionality of the manager 256 as described herein applies to both embodiments of the manager 256 including a CMB manager and a PMR manager.

The CMB/PMR manager 256 is coupled to a dynamic random access memory (DRAM) 258 and to memory 110 through a flash interface module 260. The flash interface module 260 handles communication with the memory 110. Although the CMB/PMR manager 256 is shown as implemented within the controller 104 of the storage device 102, the CMB/PMR manager 256 is not limited to the embodiment in FIG. 2. In other embodiments, the CMB/PMR manager 256 is implemented in any memory including static random access memory (SRAM), MRAM, and NAND.

The controller 104 executes computer-readable program code (e.g., software or firmware), executable instructions that are executed by various components of the controller 104 including the processor 254, logic gates, switches, application specific integrated circuits (ASICs), programmable logic controllers, embedded microcontrollers, and other components of the controller 104. The instructions may be stored in a non-transitory computer readable storage medium. Examples of a non-transitory computer readable storage medium include read-only memory or memory 110.

Instructions stored in the storage device 102 may be executed without added input or directions from the host 250. In other embodiments, the instructions are transmitted from the host 250. The controller 104 is configured with hardware and instructions to perform the various functions described herein and shown in the figures.

The storage device 102 also includes other components, such as a direct memory access DMA module 262, a scheduler 264, an error correction module 266, a command parser 268, a command executor 270, and a control path 272. The DMA module 262 executes data transfers between the host 250 and the storage device 102, without involving the CPU 202. The scheduler 264 controls the data transfer while activating the control path for fetching physical page regions (PRPs), posting completion and interrupts, and activating the DMAs for the actual data transfer between the host 250 and the storage device 102. Error correction module 266 corrects the data fetched from the memory 110. Command parser 268 parses commands to command executor 270, which is executed through the flash interface module 260.

In various embodiments, during operation of the storage device 102, various CMB/PMR features are configured such that the host 250 can write NVMe structures directly to the storage device 102. In one example, during operation of the storage device 102, the storage device 102 receives a transaction request having a PCIe format from the host 250. The manager 256 translates the PCIe transaction request to a respective data structure defined within the NVMe protocol. The data structures may fall within various types including: a submission queue (SQ), a completion queue (CQ), a physical region page (PRP) list, a scatter gather (SG) list, and host data (including read and write data). After translation, the manager 256 temporarily stores the data structures after which the data structures are moved and stored within a memory of the contoller 104, for example in DRAM 258.

The manager 256 manages data stored in a controller memory referred to herein as a memory space within the controller, which in some embodiments may span across DRAM 258, static random access memory SRAM of the controller, the memory 110, or any combination of the three (e.g., spanning across one, two, or all three types of memories in the controller 104).

In various embodiments, the host 250 initializes the memory space of the controller 104—e.g., DRAM 258—before the CMB/PMR manager 256 begins storing NVMe data structures in the memory space. During an initialization phase, the storage device 102 transmits memory space data to the host 250. The memory space data can include information such as a capability and a size of the memory space of the controller—i.e., the DRAM 258.

The capability of the memory space can include the types of data stored in the CMB/PMR including commands, completions, host pointers (PRP/SGL), read data, and write data. In one example, each type of NVMe data structure has a dedicated bit defining whether the respective NVMe data structure is supported in the CMB/PMR. In FIG. 2, the example storage device 102 stores the following types of NVMe data structures: submission queue, completion queue, PRP lists, SGL segments, and host data including read and write data. Additionally, in embodiments where the controller 104 supports more than one host, the memory space data can also include such information.

In response to receiving the memory space data, during the initialization phase, the host 250 creates all the submission and completion queues that will be stored within the memory space of the controller. For example, the host 250 may create ten submission queues and ten completion queues. During operation, when a host transmits submission queue data or receives completion queue data, the address associated with the transaction is static, defined by the host 250. Furthermore, during initialization, each queue is assigned a pointer and a size.

Figure 3:
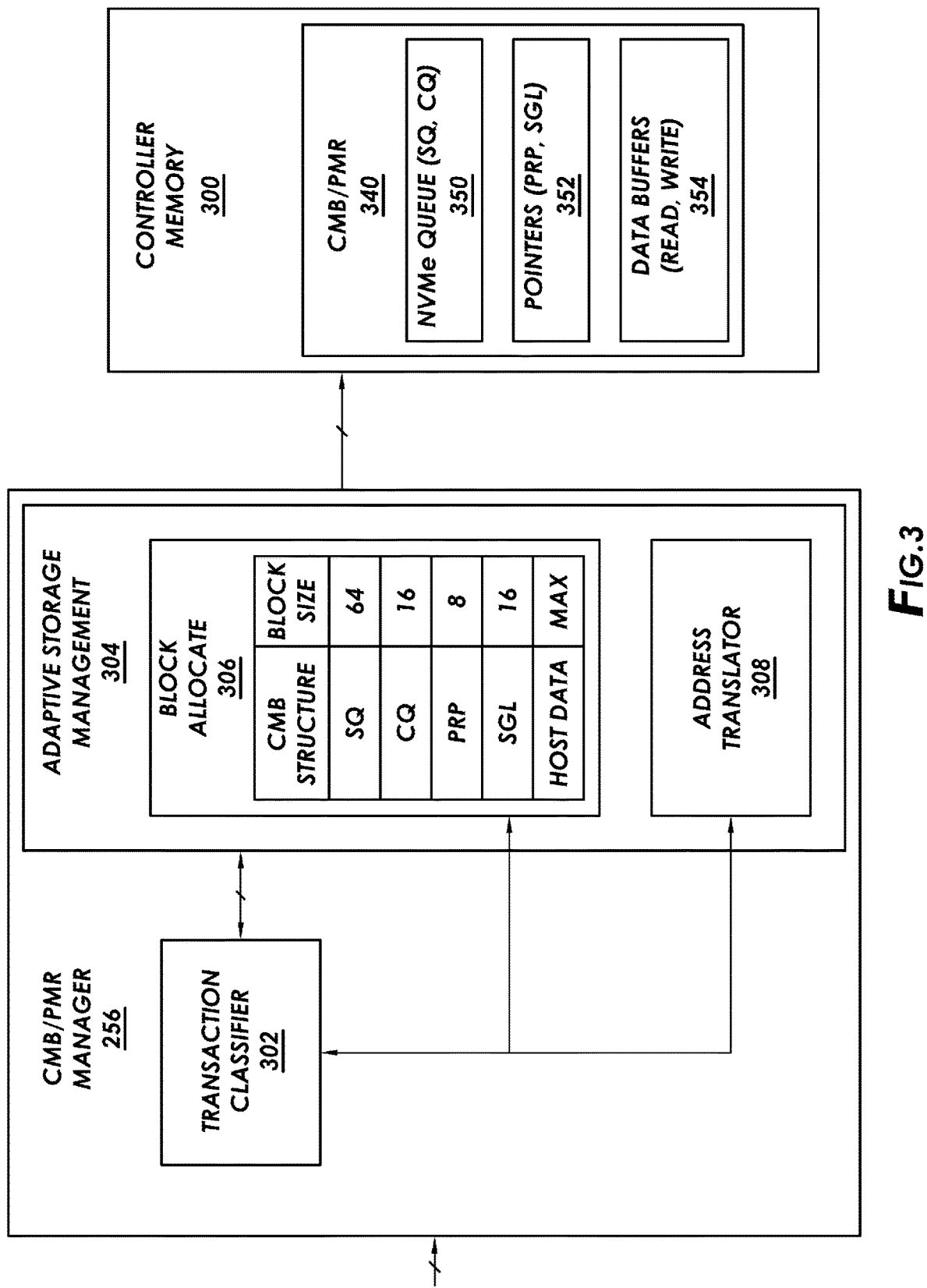
FIG. 3 is a block diagram of an example controller, in accordance with some embodiments.

FIG. 3 illustrates a portion of the controller 104 including the CMB/PMR manager 256 coupled to a memory of the controller 300, which in one example is DRAM 258 (FIG. 2). Specifically FIG. 3 illustrates additional aspects of the example CMB/PMR manager 256 coupled to an example memory space—i.e., the controller memory 300.

The controller 104 is configured to receive a host transaction, which can include a host-write or a host-read transaction. In one example, upon receiving a host-write transaction, the CMB/PMR manager 256 translates, using the transaction classifier 302, the host-write transaction from a PCIe format to an NVMe format. As part of the translation process, a type of NVMe data structure is identified. That is, the payload is associated with an NVMe data structure. The transaction classifier 302 classifies the transaction now having an NVMe format into one of three NVMe data structure groups include: NVMe queues 350, pointers 352, and data buffers 354. NVMe queues 350 include host submission queues and host completion queues.

Pointers 352 include physical region pages (PRP) lists and scatter gather list (SGL) segments. PRP lists include pointers indicating physical memory pages populated with user data or going to be populated with user data, such as for read or write commands in NVMe queues. SGL segments include pointers indicating the physical address of host memory spaces (e.g., host memory space 204), where data is transferred from, during a write command and where data is transferred to, for a read command. Data buffers 354 include write data to be written to memory 110 associated with a write command and read data from the storage device associated with a read command.

The NVMe queues 350, pointers 352, and data buffers 354, associated with a particular command can be implemented into the memory space of the controller, specifically in a CMB/PMR 340. By storing the NVMe data structures within the memory space 300 of the controller, the CMB/PMR manager 256 reduces a command execution latency of the storage device 102. For example processing a host transaction written to a submission queue implemented within the CMB/PMR 340 of the controller's memory, does not involve fetching the host transaction through the PCIe fabric, which may further include transferring the transaction through multiple switches where the host transaction is located in a host memory space.

In FIG. 3, the CMB/PMR manager 256 includes an adaptive storage management module 304 configured to determine where to store a classified host transaction within the CMB/PMR 340. The determination of where to store may be based on available resources in the memory space of the controller, a type of the NVMe structure (e.g., the classification), and an amount of space allocated for the respective type of the NVMe structure.

In one example, the adaptive storage management module 304 includes a block allocate module 306 and an address translator module 308. The block allocate module 306 determines a block size allocated for a respective type of the NVMe structure. That is, in various embodiments, the size of a submission queue (in NVMe structure) varies from a block size associated with a scatter gather list (in NVMe structure). In some embodiments, the difference in sizes of the NVMe structures can also vary by host.

The block allocate module 306 is configured to determine a block size associated with each of the NVMe structures during an initialization phase or during operation of the storage device 102. For example, as illustrated in FIG. 3, the block allocate module 306 allocates 64 bytes to the submission queue data structure, 16 bytes to the complete queue data structure, 8 bytes to the physical region pages data structure, 16 bytes to the scatter gather list data structure, and the maximum payload size defined by the host (e.g., 512 bytes, 1 kilobyte, 2 kilobytes, or 4 kilobytes).

In some examples, the block allocate module 306 can change a block size associated with an NVMe structure upon determining that the host is transmitting a data structure with a size that is different than what was previously allocated. For example, the block allocate may allocate 64 bytes per command for the NVMe data structure—submission queue. However, the CMB/PMR manager 256 may begin receiving submission queues that use 128 bytes—e.g., the host sends two commands in one transaction. Accordingly, the block allocate module 306 changes the block size associated with submission queues to 128 bytes.

In one example, the block allocate module 306 changes a block size associated with a respective NVMe data structure after the number of received transactions with a different data size is above a threshold amount. In some embodiments, the block allocate module 306 changes the block size after the number of received transactions occur within a threshold amount of time.

In various embodiments, the CMB/PMR 340 is configured to store the different types of NVMe data structures in different partitions defined within the memory space of the controller. In one example, there are as many partitions defined within the CMB/PMR 340 as there are types of NVMe data structures that the CMB/PMR manager 256 is configured to process.

For example, all NVMe queue structures 350 are stored in one partition. In some embodiments, the queue structures 350 may be further separated by type of queue structure. For example, SQ data structures are stored in one partition and CQ data structures are stored in a second partition within the CMB/PMR 340. All pointers 352 are stored in a different third partition within the CMB/PMR 340 and all data buffers 354 are stored in a different fourth partition within the CMB/PMR 340. Thus, each of the partitions within the CMB/PMR 340 store a different NVMe data structure having a particular block size.

Additionally, separate ECC schemes may be defined for each of the different types of NVMe data structures. In other words, separate ECC scheme are defined for each of the partitions. By defining different block sizes for different types of NVMe data structures, and storing the different types of NVMe data structures in different partitions using different ECC schemes, the storage system 102 can operate in a more efficient manner than when one block size is used.

In one embodiment, the CMB/PMR manager 256 implements an adaptive ECC scheme that is optimized for a respective host access. In the example where the host accesses the CMB/PMR 340 in a manner defined within the example block allocate 306, the CMB/PMR 340 may define ECC schemes for each of the NVMe data structures. For example, for the NVMe data structure SQ having a block size of 64 bytes, an ECC scheme is defined to protect the 64 bytes. For the NVMe data structure CQ having a block size of 16 bytes, an ECC scheme is defined to protect the 16 bytes. For the NVMe data structure PRP, an ECC scheme is defined to protect 8 bytes, and for the NVMe data structure SGL, an ECC scheme is defined to protect 16 bytes. For the NVMe data structure host data, an ECC scheme is defined to protect the defined data block size for the host data.

In contrast, using a single block size to accommodate the different types of NVMe data structures can be cumbersome. Where one block size is used to store all different types of NVMe data structures, the controller 104 is configured to use a single ECC block scheme. For example, when the controller 104 accesses a pointer (smaller size than a host data), such an operation includes accessing the whole data block and performing any decoding or error correction needed for the whole data block. That is, of the whole data block, the pointer is defined within a small portion of the whole data block. As the whole data block is accessed even for a small portion of the data block, the same amount of energy is expended for an access to a smaller portion of the data block as an access to the whole data block.

In FIG. 3, by storing different types of NVMe data structures using different block sizes and different ECC schemes, a controller 104 may access smaller data blocks (e.g., NVMe pointer) having an ECC scheme that sufficiently protects the smaller block size, or larger data blocks for the NVMe data structures (e.g., host data) having a different ECC scheme that also sufficiently protects the larger block. Where the pointer is stored using a smaller block size (e.g., 8 or 16 bytes), a smaller number of parity or error correction bits may be used. In turn, when the pointer data is accessed, the controller 104 accesses the data block containing just the pointer data and performs decoding and error correction on the smaller data block containing just the pointer data. Accordingly, when the controller 104 accesses the smaller block size, the controller 104 uses less energy and is faster at accessing the pointer than if the pointer were stored within a much larger block size.

In some embodiments, the adaptive storage management 304 within the CMB/PMR manager 256 additionally includes an address translator 308. Upon receiving the host transaction (in PCIe format) and translating to an NVMe data structure, the CMB/PMR manager 256 may determine a destination of the NVMe data structure based on a destination address of the NVMe data structure. In various embodiments, the translating includes identifying and associating an NVMe data structure that correlates to the received host transaction (in PCIe format).

The address translator 308 is configured to generate a destination address of the NVMe data structure based on a type of the NVMe data structure. In one example, the address translator 308 accesses partition information of the CMB/PMR 340, such as memory addresses associated with a partition and the block size of the partition.

As a size of an NVMe data structure varies based on the type, the address translator 308 is configured to assign a destination address of the NVMe data structure based on the type of the NVMe data structure—the address translator 308 assigns a destination address that falls within a respective partition having a block size that accommodates the type of the NVMe data structure. In some embodiments, the address translator 308 is configured to determine which partition stores which type of NVMe data structure and the address translator 308 assigns the destination address to an NVMe data structure such that the NVMe data structure is stored in the appropriate partition.

In FIG. 3, as each of the partitions within the CMB/PMR 340 is associated with a respective ECC scheme, the controller 104 generates parity data for an NVMe data structure based on the ECC scheme associated with a partition. For example, once the address translator 308 determines a destination address for an NVMe data structure, the destination address is associated with a partition—where the partition is associated with a block size. The controller 104 generates parity data corresponding with the partition associated with the destination address.

Figure 4:
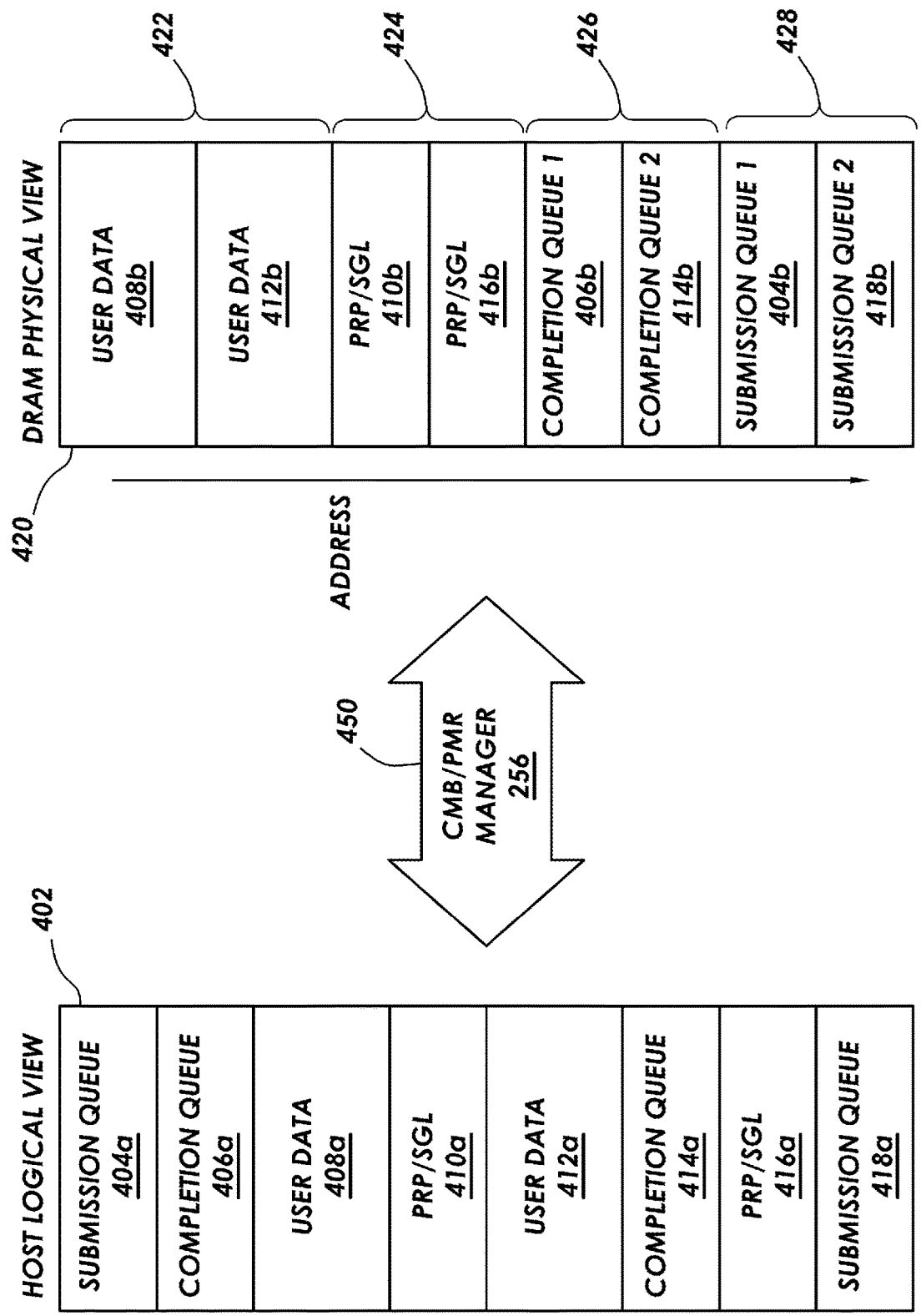
FIG. 4 illustrates, in block diagram form, data stored within an example host and example storage device, in accordance with some embodiments.

FIG. 4 illustrates in block diagram form, data stored within a host, such as host 106 or 250, and the example storage device 102. Block 402 represents data originating or received by the host and represents a logical view of the data as viewed from the point of view of the host, such as host 106 or 250. Block 420 represents data stored within the memory space of the controller after the data from the host is processed by the controller's CMB/PMR manager 256 (FIG. 2).

In the block 402, the host logically defines a plurality of queue data, pointers, and user data. The block 402 represents data that the host receives or generates within a particular time period. With time, the data within the block 402 changes dynamically and as a function of a workload of the host. In one example, the block 402 represents a sequence of data as they have occurred within the host within a particular time window.

In particular with regards to the block 402 in FIG. 4, within the particular time window, the host generates and transmits submission queue data 404a, receives completion queues data 406a, generates and transmits host/user data 408a, generates and transmits PRP/SGL data 410a, generates and transmits user data 412a, generates and transmits completion queue data 414a, generates and transmits PRP/SGL data 416a, and generates and transmits submission queue data 418a.

The various data described within the block 402 are translated by the CMB/PMR manager 256 within the controller 104 (as described in FIG. 3) and stored within the memory space of the controller 104. The data captured by block 402 is defined using a PCIe protocol, while the data illustrated in block 420 represents the data from block 402 that has been processed by the CMB/PMR manager 256 in a manner described herein. The block 420 represents a physical view of the DRAM 258 (FIG. 2), where the data is stored by type of NVMe data structure.

In the block 420, the two blocks at the top are user data blocks 408b and 412b. The user data block 408b corresponds to the user data block 408a (in block 402), while the user data block 412b corresponds to the user data block 412a (in block 402). In one example the user data blocks 408a and 412a have a PCIe protocol, while the user data blocks 408b and 412b have an NVMe data structure—after undergoing translation and classification by the CMB/PMR manager 256.

In block 420, the user data blocks 408b and 412b are stored within a first partition 422 within the memory space of the controller. Although the user data blocks 408b and 412b are viewed in a certain logical order by the host 106, after the user data blocks 408a and 412a are processed—i.e., classified by the CMB/PMR manager 256—because the data block 408a and 412a have the same type of NVMe data structure, they are stored in the same partition (e.g., the partition 422).

In the example illustrated in FIG. 4, the partition 422 stores data in block sizes large enough to accommodate the host data/user data type of NVMe data structure. For example the partition 422 stores data in a block size that corresponds to a maximum payload size defined by the host 106 (e.g., 512 bytes, 1 kilobyte, 2 kilobytes, or 4 kilobytes).

In block 420 of FIG. 4, the next set of data are PRP/SGL 410b and PRP/SGL 416b. PRP/SGL 410b corresponds to PRP/SGL 410a (in block 402), while PRP/SGL 416b corresponds to PRP/SGL 416a (in block 402). The data PRP/SGL 410b and PRP/SGL 416b are stored in partition 424 within the memory space of the controller. In the example illustrated in FIG. 4, the partition 424 stores data in block sizes large enough to accommodate the PRP/SGL type of NVMe data structure. In one example, the partition 424 stores data using 8 bytes. In another example, the partition 424 stores data using 16 bytes. In other embodiments, the partition 424 stores data using anywhere between 4 and 32 bytes.

In the example illustrated in FIG. 4, the partition 426 stores completion queue types of NVMe data structures. Partition 426 of block 420 includes the completion queues 406b and 414b. The completion queue 406b corresponds to the completion queue 406a, while the completion queue 414b corresponds to the completion queue 414a. In the example illustrated in FIG. 4, the partition 426 stores data in block sizes large enough to accommodate the completion queue type of NVMe data structure. In one example, the partition 426 stores data using 16 bytes. In other examples, the partition 426 stores data using anywhere between 8 and 64 bytes.

Additionally, in the block 420, the partition 428 stores submission queue types of NVMe data structures. Partition 428 includes submission queues 404b and 418b. The submission queue 404b corresponds to the submission queue 404a, while the submission queue 418b corresponds to the submission queue 418a. The partition 428 stores data in block sizes large enough to accommodate the submission queue type of NVMe data structure. In one example, the partition 428 stores data using 64 bytes. In other examples, the partition 428 stores data using anywhere between 16 and 512 bytes.

Each of the partitions 422, 424, 426, and 428 store data using different ECC schemes. For example, when the controller 104 prepares the user data 408b for storage within the memory space of the controller—translates to NVMe data structure, determines a destination address based on the type of NVMe data structure—the controller 104 also generates parity data associated with the user data 408b. The size of the parity data corresponds to the block size used to store the user data 408b. In one example, where the partition 422 stores data using 512 bytes, the controller 104 in configured to use an adaptive ECC scheme to generate parity bits for the 512 bytes.

In contrast, when the controller 104 prepares the completion queue 406b for storage within the memory space of the controller, the controller 104 generates parity data that is adapted to protect the smaller block size. In one example, where the partition 426 stores data using 16 bytes, the controller 104 generates parity bits for the 16 bytes—using the adaptive ECC scheme.

Although the example in FIG. 4 describes how data from a single host is stored within the memory space of the controller, embodiments are contemplated in which multiple hosts are connected to the same storage device 102, and the controller 104 stores data from multiple hosts within the memory space of the controller. In one embodiment, all data—regardless of the host from which the data originates—that have the same type of NVMe data structure, are stored within the same partition. For example, the CMB/PMR of the controller stores user data, PRP/SGL, completion queue data, and submission queue data from two or more hosts.

Each of the data are stored in the respective partitions. The user data from the different hosts are stored within the partition 422, the PRP/SGL data from the different hosts are stored within the partition 424, the completion queue data from the different hosts are stored within the partition 426, and the submission queue data from the different hosts are stored within the partition 428.

Additionally, the size of the block stored within each of the partitions is allocated dynamically. That is, the controller 104, based on various criteria (i.e., data received from a host, and collected data during operation) may change the block size used with a partition. The controller 104 can accommodate various detected host patterns and modifies attributes of a respective partitive based on a particular detected host pattern.

To illustrate, in one example, the controller 104 may set the data block size for the partition 422 (e.g., stores user data) to 512 bytes. The controller 104 may set the block size to 512 bytes based on data received from the host during initialization. During operation of the storage device 102, the controller 104 receives user data that use a larger block size, such as 1 kilobyte.

The controller 104 may change the block size allocated to the partition 422 to 1 kilobytes after the number of received user data having a size of 1 kilobyte is above a threshold amount. For example, after the controller receives 20 transactions with user data having a size of 1 kilobyte, the controller 104 changes the block size of the partition 422 to 1 kilobyte. Alternatively, the controller 104 creates a new partition to accommodate the user data having block sizes that are 1 kilobyte and stores the user data in the new partition. Any variations that may be considered dynamic allocation of block size in the partitions is contemplated by this disclosure.

As another non-limiting example, the controller 104 may change the block size after receiving the user data having block sizes that are 1 kilobyte within a threshold period of time. Furthermore, as part of the dynamic allocation, a controller 104 is configured to alter a size of a respective partition based on workload.

In another example, the controller 104 is configured to change an ECC scheme based on a host access pattern. To illustrate, an ECC scheme for a particular partition may be for 1 kilobyte of data. The controller 104 may detect that host accesses of data within the particular partition have a size of 512 bytes. Accordingly, the controller 104 can detect this type of host access pattern and change the ECC scheme associated with the particular partition to an ECC scheme that protects 512 bytes. Accordingly, various methods and techniques may be implemented such that the partitions are allocated and defined dynamically.

By configuring the controller 104 to store the different types of NVMe data structures in different partitions defining different block sizes, a controller 104 operates more efficiently and more quickly than if a single block size is used for all types of NVMe data structure. Next, methods for implementing the techniques herein are described.

Figure 5:
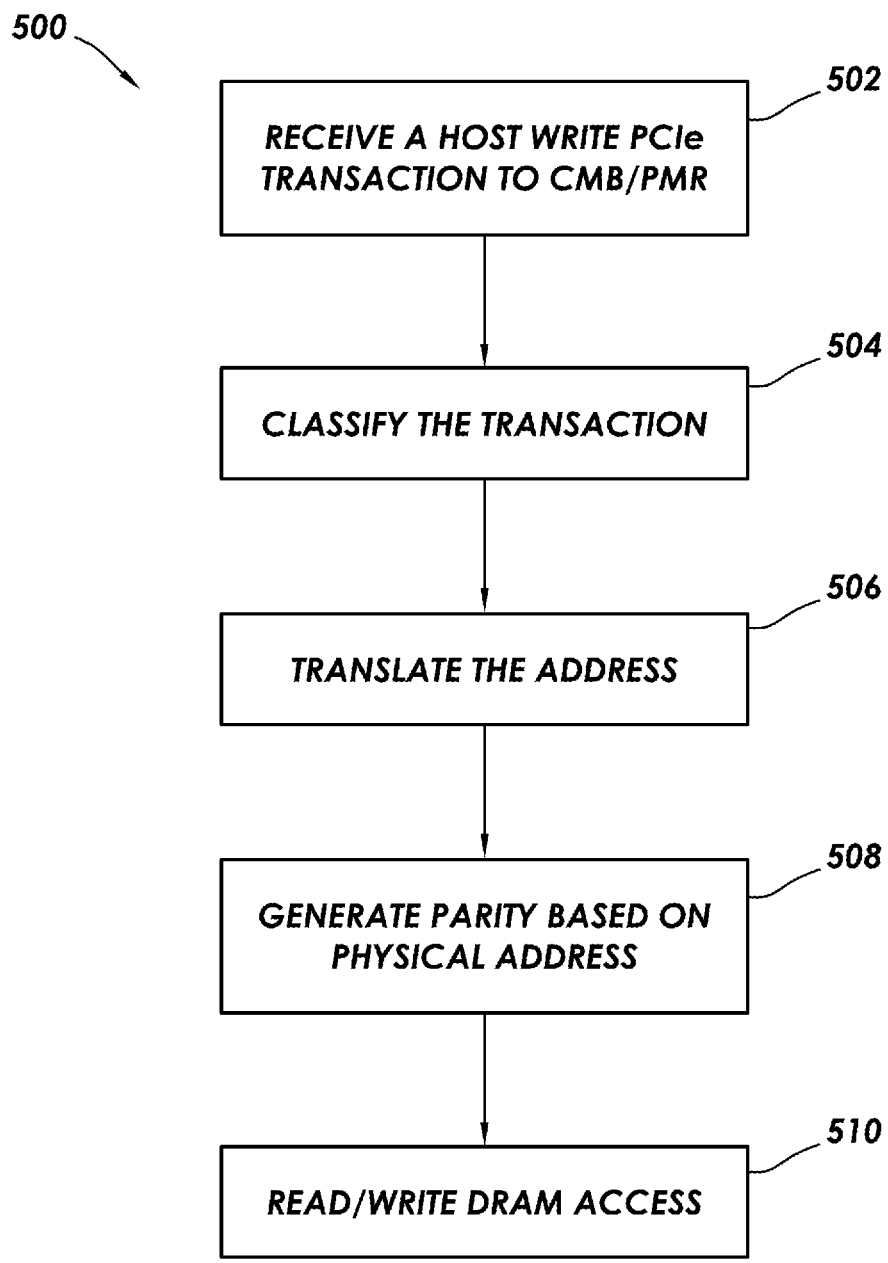
FIG. 5 is a flow chart illustrating a method in accordance with some embodiments.

FIG. 5 illustrates a method 500 in accordance with various embodiments. The method may be performed by any suitable memory components in any suitable memory design, such as the one discussed in FIG. 1 or 2, that supports managing a host transaction in a manner discussed. In various embodiments, some of the blocks shown in FIG. 5 may be performed concurrently, in a different order than shown, or omitted. Additional method elements may be performed as desired.

Specifically, the method 500 begins with the controller 104 receiving a host-write transaction (block 502). For example, the controller's CMB/PMR manager receives the host-write transaction which is in a PCIe format.

Next, the controller's CMB/PMR manager classifies the transaction (block 504). During the classification, the CMB/PMR manager translates the host-write transaction from a PCIe format to an NVMe data structure. The CMB/PMR manager may classify the NVMe data structure based on a type of the NVMe data structure to generate a classified transaction.

Next, the controller's CMB/PMR manager translates the address (block 506). In various embodiments, translating the address includes determining a destination address (e.g., physical address) of the classified transaction, based on the classification of the transaction. For example, if the transaction is classified to be of the user data type, the controller 104 may determine a destination address to be within the partition 422 (FIG. 4). As another example, if the transaction is classified to be of the type PRP/SGL, the controller 104 may determine a destination address to be within the partition 424 (FIG. 4).

Additionally, the controller's CMB/PMR manager generates parity data based on the physical address (e.g., destination address) of the classified transaction. For purposes of illustration, in the example where the transaction is classified to be of the user data type and a destination address is within the partition 422, the controller 104 generates a parity according to the block size associated with the partition 422. More specifically, the block size associated with the partition 422 can be 512 bytes, and accordingly, the controller 104 generates parity data large enough to protect the 512 bytes.

At block 510, the controller 104 performs a read or write DRAM access. In various embodiments, the host-write transaction may be stored in an SRAM, DRAM (as described herein), memory 110, or any combination thereof. In various embodiments, the method 500 improves an efficiency and performance, while reducing power consumption of the storage device 102.

Figure 6:
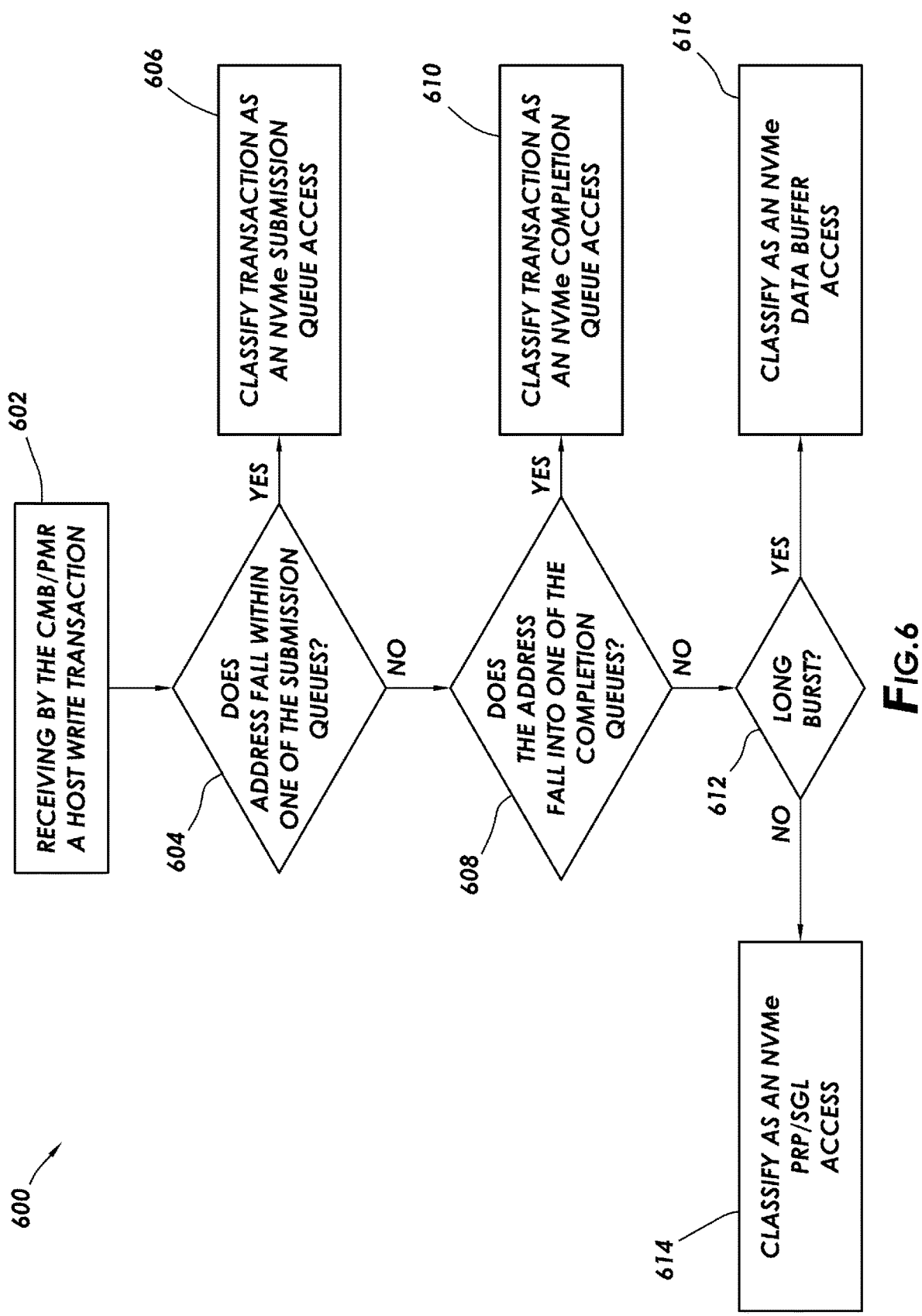
FIG. 6 is a flow chart illustrating a method in accordance with some embodiments.

FIG. 6 illustrates a method in accordance with various embodiments. The method may be performed by any suitable memory components in any suitable memory design, such as the one discussed in FIG. 1 or 2, that supports managing a host transaction in a manner discussed. In various embodiments, some of the blocks shown in FIG. 6 may be performed concurrently, in a different order than shown, or omitted. Additional method elements may be performed as desired. In one example, the method 600 describes a method of classifying a transaction.

Specifically, the method 600 begins with the controller 104 receiving a host-write transaction (block 602). For example, the controller's CMB/PMR manager receives the host-write transaction which is in a PCIe format. In some embodiments, if the transaction is a submission or completion queue, the address for the transaction may be known to the device as the addresses for these types of transactions are statically defined by the host. In contrast, if the transaction is a pointer (PRP/SGL) or data access, the address may not be known or defined by the host.

Next, the controller's CMB/PMR manager determines whether an address of the host-write transaction falls within one of the submission queues (decision block 604). As the address may be statically defined by the host, the CMB/PMR manager is able to, in one example, identify whether the address falls within one of the submission queues. In another example, if the destination address associated with the transaction falls within the partition 428 (FIG. 4), the controller's CMB/PMR manager classifies the transaction as an NVMe submission queue access (block 606).

If the CMB/PMR manager determines the address does not fall within one of the submission queues, next, the CMB/PMR manager determines whether the address of the host-write transaction falls within one of the completion queues (decision block 608). For example, if the destination address associated with the transaction falls within the partition 426 (FIG. 4), the controller's CMB/PMR manager classifies the transaction as an NVMe completion queue access (block 610).

If the CMB/PMR manager determines the address does not fall within one of the completion queues, next, the CMB/PMR manager determines whether the host-write transaction is associated with a long burst (decision block 612). If the host-write transaction is associated with a long burst, the CMB/PMR manager classifies the transaction as a data buffer access (block 616). If the host-write transaction is not associated with a long burst, the CMB/PMR manager classifies the transaction as an NVMe PRP/SGL access (block 614). The CMB/PMR manager infers the host-write transaction involves pointers as pointers have a smaller size than data buffers.

Accordingly, the method 600 illustrates a method of classifying a host-write transaction. In various embodiments, the method 600 improves an efficiency and performance, while reducing power consumption of the storage device 102.

The above discussion is meant to be illustrative of the principles and various embodiments described herein. Numerous variations and modifications will become apparent to those skilled in the art once the above disclosure is fully appreciated. For example, although a controller 104 has been described as performing the methods described above, any processor executing software within a host system can perform the methods described above without departing from the scope of this disclosure. In particular, the methods and techniques described herein as performed in the controller, may also be performed in a host, where the host accesses memory space of the controller. Furthermore, the methods and concepts disclosed herein may be applied to other types of persistent memories other than flash. It is intended that the following claims be interpreted to embrace all such variations and modifications.

What is claimed is:
1. A storage device, comprising:
   a non-volatile memory;
   a volatile memory; and
   a controller comprising a memory, wherein the controller is configured to:
      receive a host-write transaction directed to a memory space defined within the controller, wherein the host-write transaction includes a destination address;
      classify the host-write transaction based on a type of the host-write transaction to generate a classified transaction;

generate parity data based on the classified transaction; and store data associated with the host-write transaction and the parity data in a portion of the memory space in the controller, wherein when the controller classifies the host-write transaction, the controller is configured to:

translate the host-write transaction from a first protocol to a Non-Volatile Memory Express (NVMe) protocol to generate an NVMe transaction;

determine a type of the NVMe transaction; and determine a destination address based on the type of the NVMe transaction.

2. The storage device of claim 1, wherein the portion of the memory space comprises:

a first partition for storing submission queue data;
a second partition for storing completion queue data;
a third partition for storing a pointer; and
a fourth partition for storing host data, wherein each of the partitions is associated with a respective block size.

3. The storage device of claim 2, wherein when the controller generates the parity data, the controller is configured to:

determine the data associated with the host-write transaction is stored in the first partition; and generate the parity data based on the block size associated with the first partition, wherein a size of the parity data corresponds to the block size associated with the first partition.

4. The storage device of claim 1, wherein when the controller classifies the host-write transaction, the controller is configured to:

determine a destination address of the classified transaction; and classify the host-write transaction based on the destination address.

5. The storage device of claim 1, wherein when the controller generates the parity data, the controller is configured to:

determine an allocated block size associated with the destination address; and generate the parity data based on the allocated block size, wherein the allocated block size varies based on the destination address.

6. A method of accessing a storage device, comprising:

receiving, by a controller of the storage device, a host-write transaction directed to a memory space defined within the controller;

classifying the host-write transaction based on a type of the host-write transaction to generate a classified transaction;

generating a parity data based on the classified transaction; and storing data associated with the host-write transaction and the parity data in a memory of the controller, wherein classifying the host-write transaction further comprises:

translating the host-write transaction from a first protocol to a Non-Volatile Memory Express (NVMe) protocol to generate the classified transaction, wherein the data associated with the host-write transaction defines a type of data comprising at least one selected from the group consisting of: a submission queue data, a completion queue data, a pointer, and a host data.

7. The method of claim 6, wherein classifying the host-write transaction further comprises:

determining a destination address of the classified transaction; and classifying based on the destination address.

8. The method of claim 7, wherein generating the parity data further comprises:

determining an allocated block size associated with the destination address; and generating the parity data based on the allocated block size, wherein the allocated block size varies based on the destination address.

9. The method of claim 7, wherein the destination address falls within a portion of the memory of the controller, wherein the portion of the memory includes a first section and a second section, wherein the first section stores pointers and the second section stores host data; and wherein the first section is associated with a first size of parity data, and the second section is associated with a second size of parity data.

10. The method of claim 6, wherein the memory of the controller defines a first partition storing submission queue data, a second partition storing completion queue data, a third partition storing pointers, and a fourth partition storing host data, wherein the first, second, third, and fourth partitions comprise a portion of the memory of the controller and wherein each of the partitions of the portion is associated with a respective error correction code size.

11. The method of claim 10, further comprising:

storing the data associated with the host-write transaction in the portion of the memory based on the type of the data.

12. The method of claim 6, wherein the memory of the controller is a dynamic random access memory.

13. The method of claim 6, wherein the memory space is a controller memory buffer (CMB) or a persistent memory region (PMR).

\* \* \* \* \*